(12) United States Patent
Antila et al.

(10) Patent No.: US 8,654,347 B2
(45) Date of Patent: Feb. 18, 2014

(54) MICROMECHANICAL TUNABLE FABRY-PEROT INTERFEROMETER ARRANGEMENT AND A METHOD FOR PRODUCING THE SAME

(71) Applicant: Teknologian tutkimuskeskus VTT, Vuorimiehentie (FI)

(72) Inventors: Jarkko Antila, Vuorimiehentie (FI); Martti Blomberg, Vuorimiehentie (FI)

(73) Assignee: Teknologian Tutkimuskeskus VTT, VTT (FI)

( * ) Notice: Subject to any disclaimer, the term of this patent is extended or adjusted under 35 U.S.C. 154(b) by 0 days.

(21) Appl. No.: 13/911,319

(22) Filed: Jun. 6, 2013

(65) Prior Publication Data

US 2013/0329232 A1 Dec. 12, 2013

(30) Foreign Application Priority Data

Jun. 8, 2012 (FI) ...................................... 20125629

(51) Int. Cl.
*G01B 9/02* (2006.01)
*G02B 27/00* (2006.01)

(52) U.S. Cl.
USPC .......................................... 356/519; 359/578

(58) Field of Classification Search
USPC ........... 356/454, 480, 519; 359/260, 577–579
See application file for complete search history.

(56) References Cited

U.S. PATENT DOCUMENTS

| 6,765,679 B2 * | 7/2004 | Ducellier et al. ............. 356/491 |
| 7,844,145 B1 | 11/2010 | Waters |
| 2002/0191268 A1 | 12/2002 | Seeser et al. |
| 2012/0050751 A1 * | 3/2012 | Blomberg ..................... 356/519 |
| 2012/0181647 A1 * | 7/2012 | Blomberg ..................... 257/432 |
| 2013/0169970 A1 * | 7/2013 | Fan et al. ...................... 356/454 |

FOREIGN PATENT DOCUMENTS

WO 03052506 6/2003

OTHER PUBLICATIONS

FI Search Report, Dated Apr. 9, 2013, in FI 20125629.
FI Office Action, in FI 20125629, dated Apr. 9, 2013.

* cited by examiner

*Primary Examiner* — Michael A Lyons
(74) *Attorney, Agent, or Firm* — Young & Thompson

(57) ABSTRACT

The invention relates to controllable Fabry-Perot interferometers which are produced with micromechanical (MEMS) technology. The prior art interferometers have a temperature drift which causes inaccuracy and requirement for complicated packaging. According to the invention the interferometer arrangement has both an electrically tuneable interferometer and a reference interferometer on the same substrate. The temperature drift is measured with the reference interferometer and this information is used for compensating the measurement with the tuneable interferometer. The measurement accuracy and stability can thus be improved and requirements for packaging are lighter.

10 Claims, 2 Drawing Sheets

US 8,654,347 B2

MICROMECHANICAL TUNABLE FABRY-PEROT INTERFEROMETER ARRANGEMENT AND A METHOD FOR PRODUCING THE SAME

TECHNICAL FIELD

The invention relates to a Fabry-Perot interferometer arrangement and a method for producing a Fabry-Perot interferometer arrangement. More specifically, the invention relates to tunable Fabry-Perot interferometers which are produced with micromechanical (MEMS) technology. The technical field of the invention is specified in the preamble of the independent claims.

BACKGROUND TECHNOLOGY

Fabry-Perot interferometers are used as optical filters and in spectroscopic sensors, for example. A Fabry-Perot interferometer is based on two mirrors, whereby a Fabry-Perot cavity is formed into a gap between the mirrors. The pass band wavelength of a Fabry-Perot interferometer can be controlled by adjusting the distance between the mirrors i.e. the width of the gap. It is common to use micromechanical technology for producing Fabry-Perot interferometers. Such a solution is described e.g. in patent document FI95838.

A micromechanical interferometer usually includes a substrate and layers of two materials with different refractive coefficients, such as silicon dioxide and silicon. Mirrors of the interferometer are comprised of alternating layers of the two materials. A movable mirror is provided by removing a sacrificial layer, which has initially been formed between two mirrors. The position of a moveable a mirror is controlled by applying voltage to electrodes, which are included in the mirror structures.

The micromechanical production technology allows series production of interferometers. However, there are some disadvantages related with the prior art interferometer components. Prior art Fabry-Perot interferometers have high requirements for the packaging of the interferometer in order not to cause instability of the interferometer due to changing conditions. However, in many applications, such as automotive industry, the cost of the components must be kept low, and providing special packaging would cause the production cost to rise. It is also quite difficult to avoid changes of temperature of the environment from affecting the temperature of the interferometer. As a result, temperature drift occurs in the wavelength response of the interferometer, and the stability of the interferometer is not sufficiently high.

SUMMARY OF THE INVENTION

The purpose of the present invention is to avoid or reduce disadvantages of the prior art.

The object of the invention is achieved with a solution, in which the Fabry-Perot interferometer arrangement comprises both an electrically tuneable interferometer and a reference interferometer on the same substrate. The response of the reference interferometer is measured, for example, in connection with each measurement made with the tuneable interferometer. The effect of temperature change is similar to the both interferometers, and therefore the measurement of the response of the reference interferometer can be used for temperature compensation of the measurement results of the tuneable interferometer. If a still more accurate temperature compensation is required, it is possible to use compensation based on temperature measurement in addition to the compensation with reference interferometer.

The reference interferometer covers a part of the aperture, whereby part of the radiation travelling through the interferometer arrangement passes through the reference interferometer. Preferably all radiation through the aperture is received by a detector. When radiation is received from the radiation source and scanned with the interferometer a peak can be detected at the nominal wavelength of the reference interferometer. Due to temperature change, the wavelength of the peak is shifted and the requirement of compensation can be derived based on the shift. The reference interferometer is preferably designed to have its peak within the normal range of operation of the tuneable interferometer in order to detect the peak. It is also preferable to design the peak wavelength of the reference interferometer to be outside the absorbing range of the material which is measured with the tuneable interferometer. This way the material does not affect the function of the reference interferometer.

A Fabry-Perot interferometer arrangement with an aperture allowing transmission of radiation, the arrangement comprising an electrically tunable Fabry-Perot interferometer which has
  a substrate,
  a first mirror structure on the substrate,
  a second, movable mirror structure, whereby the first and second mirror structures comprise first and second mirrors which are substantially parallel,
  a Fabry-Perot cavity between the first and second mirrors,
  electrodes for electrical control of the distance between the mirrors,
is characterised in that
the arrangement comprises at least one further mirror structure at the opposite surface of the substrate for forming a reference Fabry-Perot interferometer within the aperture of the arrangement.

A method for producing a Fabry-Perot interferometer arrangement, wherein
  a substrate is provided,
  a first mirror structure is provided on the substrate,
  a second, movable mirror structure is provided, whereby the first and second mirror structures comprise first and second mirrors which are substantially parallel,
  a Fabry-Perot cavity is provided between the first and second mirrors,
  providing electrodes for electrical control of the distance between the mirrors, is characterised in that
  at least one further mirror structure is provided at the opposite surface of the substrate for providing a reference interferometer.

Some preferable embodiments of the invention are described in the dependent claims.

According to one embodiment of the invention the arrangement comprises two further mirror structures, namely a third mirror structure and a fourth mirror structure, at an opposite surface of the substrate with a determined gap between the third and fourth mirror structures, whereby said gap serves as a cavity and the third and fourth mirror structures serve as mirrors of the reference Fabry-Perot interferometer. In a further embodiment the gap between the third and fourth mirrors comprises solid material.

According to another embodiment of the invention the reference Fabry-Perot interferometer comprises the fixed mirror structure of the electrically tunable Fabry-Perot interferometer, the substrate as a cavity and one further mirror structure at the opposite surface of the substrate. In a further embodiment the substrate comprises a plurality of wells at the area of the reference Fabry-Perot interferometer, whereby the further mirror structure is at least in part located at the bottom surface of the wells.

According to one embodiment the reference Fabry-Perot interferometer covers a border area of the aperture of the arrangement.

According to still one embodiment the arrangement comprises patterned material layer for forming the aperture, whereby the patterned material layer is located on a further mirror structure of the reference Fabry-Perot interferometer.

According to one embodiment the layers of the mirrors at the opposite sides of the substrate are simultaneously deposited. In another embodiment of the invention the mirror layers of the reference interferometer are deposited separately from the mirror layers of the tuneable interferometer. This way it is possible to select the materials, thicknesses and number of the layers independently for both interferometers.

Significant advantages can be achieved with the invention when compared to the prior known solutions. It is possible to achieve high temperature stability since the effect of the changes in temperature can be compensated to large extent. It is also possible to reduce the requirements of packaging and thus reduce the cost of the packaging and the whole component/system. Further, it is possible to use the interferometer in harsher conditions.

The interferometers according to the invention are well suited for various ranges of wavelength. It is necessary to choose materials for the substrate and the mirror layers which are transparent for the operating wavelength. It is also necessary to select the operating wavelength of the reference interferometer in such a way that any material between the light source and the interferometer does not substantially absorb the radiation.

In addition to temperature compensation the invention can also be used for compensating the effect of mechanical vibration on Fabry-Perot interferometers, for example.

In this patent application the term "mirror" means a structure where there is a layer or a set of layers which reflects light.

In this patent application the terms "radiation" or "light" are used to mean any radiation in the optical range of wavelengths.

In this patent application "gap width" means the distance between the mirrors at the concerned position. It is possible that the gap is vacuum or includes material that can be air or other gas, for example. In the reference Fabry-Perot interferometer the gap preferably includes solid material.

In this patent application "front surface" of a substrate means the surface on which the mirrors of main Fabry-Perot interferometer are located. The reference Fabry-Perot interferometer is located at the opposite surface or "back surface".

SHORT DESCRIPTION OF THE DRAWINGS

In the following part the preferable exemplary embodiments of the invention are described in more detail by referring to the enclosed drawings, in which.

DETAILED DESCRIPTION OF THE EMBODIMENTS

Figure 1:
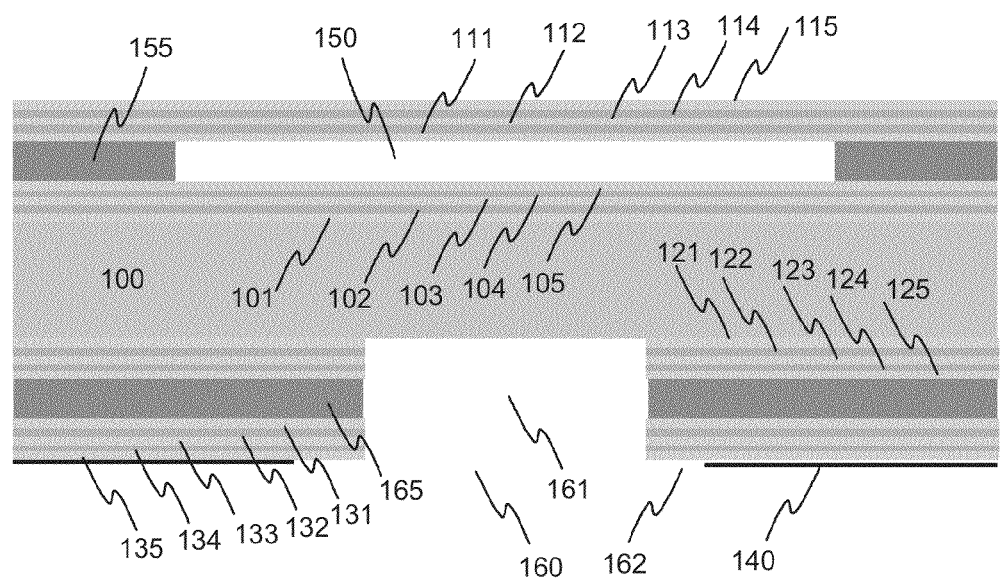
FIG. 1 illustrates a cross section of an exemplary Fabry-Perot interferometer arrangement according to the invention.

FIG. 1 illustrates a cross section of an exemplary Fabry-Perot interferometer according to the invention. The interferometer has a substrate 100 of e.g. monocrystalline silicon material, on which there are reflecting layers of the fixed mirror, provided by layers 101-105, wherein layers 102 and 104 are of polycrystalline silicon, and layers 101, 103 and 105 are of silicon dioxide, for example. The Figure does not show the electrode layer, which can be on the fixed mirror structure.

The interferometer has a second, movable mirror which has reflecting layers 111-115. Layers 112 and 114 are of polycrystalline silicon, and layers 111, 113 and 115 are of silicon dioxide, for example. The Figure does not show the electrode layer, which can be at the movable mirror structure.

The cavity of the interferometer is formed by the space 150, from which sacrificial layer has been removed. The sacrificial layer is etched e.g. by vapour HF through holes (not shown) of the second mirror structure. The second mirror will thus become movable. The sacrificial layer has been removed from the optical area of the interferometer but it is not removed from the edges 155 of the sacrificial layer.

The back side of the interferometer arrangement has layers of the reference interferometer. In the arrangement of FIG. 1 the third mirror structure has reflecting layers 121-125 layers that correspond to the layers 101-105 of the electrically tuneable interferometer, respectively. The fourth mirror structure has reflecting layers 131-135 layers that correspond to the layers 111-115 of the electrically tuneable interferometer, respectively. The Fabry-Perot cavity 165 of the reference interferometer includes same material as used in the sacrificial layer of the electrically tuneable interferometer.

At the back surface of the interferometer arrangement there may be a protective layer, which may protect the materials from humidity and serve as an antireflection layer, for example.

The aperture for radiation is formed by a patterned layer 140 of e.g. aluminium or some other material which does not transmit radiation within the operating range of the interferometer. The aperture 160 of the arrangement has a middle area 161, which is without layers of the reference Fabry-Perot interferometer. The reference interferometer extends to the border area 162 of the aperture.

In the structure described above the radiation penetrates through the substrate 100, and the substrate must therefore be transparent for radiation of operative wavelength range of the interferometer.

It is also possible that the substrate layer is used as a cavity of the reference interferometer. In this case the reference interferometer has one mirror structure at the back surface of the substrate and one mirror structure at the front surface of the substrate, which is also the fixed mirror structure of the electrically tuneable interferometer. However, the substrate is relatively thick for the use of a cavity, whereby it is preferable to provide plurality of wells at the back surface of the substrate. The back surface mirror is then deposited to the bottom surfaces of the wells, and the thickness of the cavity formed by the substrate material is smaller.

Figure 2A:
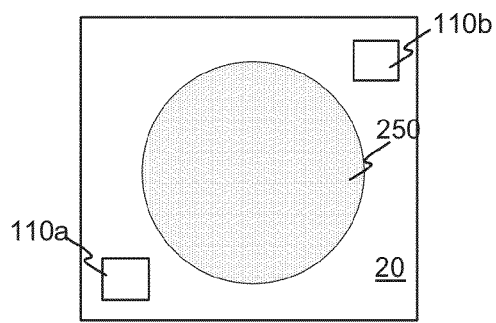
FIG. 2a illustrates a front view of an exemplary Fabry-Perot interferometer arrangement according to the invention.

FIG. 2a illustrates a front view of an exemplary Fabry-Perot interferometer arrangement 20 according to the invention. The contacts 110a and 110b for the electrodes of the upper and lower mirrors are located at corners of the interferometer. The optical area 250 is circular, and the upper, second mirror is provided with holes which have been used for removing the sacrificial layer.

Figure 2B:
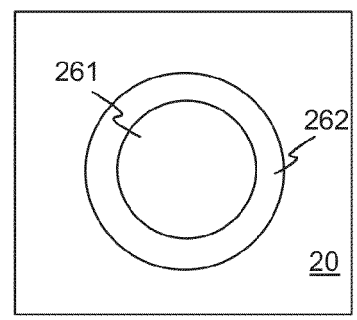
FIG. 2b illustrates a back view of an exemplary Fabry-Perot interferometer arrangement according to the invention.

FIG. 2b illustrates a back view of an exemplary Fabry-Perot interferometer arrangement 20 according to the invention. The aperture of the arrangement has a middle area 261, which is without layers of the reference interferometer, whereby the border area 262 includes the layers of the reference interferometer.

Figure 3:
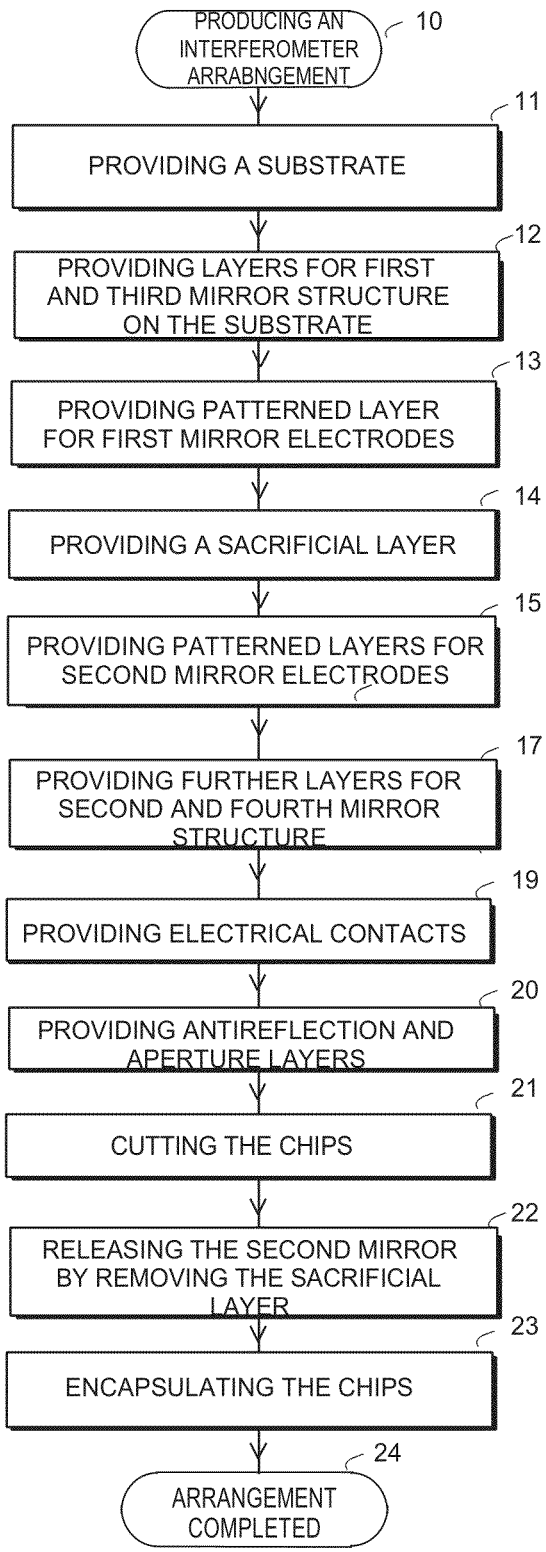
FIG. 3 illustrates a flow diagram of an exemplary process according to the invention for producing a Fabry-Perot interferometer arrangement.

FIG. 3 illustrates a flow diagram of an exemplary method according to the invention for producing a Fabry-Perot interferometer arrangement of the invention, such as an interferometer arrangement of FIGS. 1 and 2a, 2b.

The production process is started by providing a wafer (130) in phase 11. The wafer material can be e.g. monocrystalline silicon or fused silica. Next layers (101-105) of the first, fixed mirror structure are provided on the substrate. The first mirror structure can be produced by e.g. depositing successive layers of polycrystalline silicon and silicon-rich silicon nitride on the substrate, phase 12. For example, there may be two layers (102, 104) of silicon dioxide between three layers (101, 103, 105) of polycrystalline silicon. The layers (121-125) mirror structure of the reference interferometer can be deposited simultaneously as the layers of the fixed mirror structure of the electrically tuneable interferometer. The layers are deposited simultaneously at the opposite sides of the substrate.

The thickness of the layers can be e.g. 10 nm-2 µm. The actual thickness of the layers depends on the range of wavelengths at which the interferometer needs to be functional. The thickness of the layers is typically a quarter or a half of the operating wavelength of the radiation within the material of the concerned layer. These layers can be deposited on the substrate by LPCVD process, for example. A electrode layer of the first, fixed mirror can be deposited as a patterned layer of doped polycrystalline silicon. In the method of FIG. 3 this electrically conductive layer is produced in phase 13. The electrode layer is not necessary in the reference interferometer as the both mirror structures are fixed.

In phase 14 a patterned sacrificial layer (155) is provided for the electrically tuneable interferometer. The layer forming the cavity of the reference interferometer is simultaneously deposited on the opposite surface of the substrate. The sacrificial layer will define the Fabry-Perot cavity. The thickness of the sacrificial layer is defined by the required distance between the mirrors of the interferometers.

In phase 15 a patterned layer of electrodes and contacts can be provided for the movable mirror structure. The layer may also serve as an optical layer of the second, movable mirror.

In phase 17 further layers (111-115) for the second, movable mirror are formed. Simultaneously layers (131-135) for the mirror of the reference interferometer are deposited. These further layers may include, for example layers of polycrystalline silicon and layers of silicon dioxide. The thickness of the layers can be e.g. 10 nm-2 µm. The actual thickness of the layers depends on the range of wavelengths at which the interferometer needs to be functional. The thickness of the layers is typically a quarter or a half of the operating wavelength of the radiation within the material of the concerned layer. These layers can be deposited by LPCVD process, for example. Next in phase 19 the electrical contacts can be formed for the electrically tuneable interferometer.

In phase 20 a protective layer of e.g. silicon-rich silicon nitride can be deposited on the surface of the wafer, which surface is at the back side of the arrangement. This protective layer may also serve as an antireflective layer. A further patterned layer (140) of e.g. aluminium is provided for forming the aperture for radiation.

In phase 21 the chips are cut from the wafer. The sacrificial layer is then etched with vapour HF in phase 22 through the holes of the second mirror. When the sacrificial layer is removed from the optical area between the mirrors, the Fabry-Perot cavity (150) is formed to the electrically tuneable interferometer, and the second, movable mirror is released. The corresponding layer is not removed from the reference interferometer. Finally, the chips are capsulated in phase 23. The electrical contacts may be bonded, but it is also possible to use the contacts of the Fabry-Perot interferometer chip for soldering without bonding.

There are several phases in which the sacrificial layer can be removed: before the chip is cut out from the wafer or after the chip is cut from the wafer but before encapsulation of the chip.

In the process of FIG. 3 the layers of the mirrors were simultaneously deposited to opposite sides of the substrate. It is, however, possible to deposit the layers independently so that the mirror structures of the tuneable interferometer and the mirror structures of the reference interferometer have layers with different properties.

The invention has been described with the reference to the enclosed embodiments. It is, however, clear that the invention is not restricted only to those, but it comprises all embodiments which can be imagined within the inventive idea and the enclosed patent claims.

For example, some materials, dimensions and forms have been mentioned as examples for implementation of the invention. However, it is clear that dimensions, forms and materials as well as details of structure or phases of production can be changed and optimised for each implementation according to the specific requirements.

The inventive interferometers have several preferable applications. They can be used as controllable filters in various devices for measuring e.g. contents of specific gases or liquids.

The invention claimed is:

1. Fabry-Perot interferometer arrangement with an aperture allowing transmission of radiation, the arrangement comprising an electrically tunable Fabry-Perot interferometer which has a substrate, a first mirror structure on the substrate, a second, movable mirror structure, whereby the first and second mirror structures comprise first and second mirrors which are substantially parallel, a Fabry-Perot cavity between the first and second mirrors, electrodes for electrical control of the distance between the mirrors, characterised in that the arrangement comprises at least one further mirror structure at the opposite surface of the substrate for forming a reference Fabry-Perot interferometer within the aperture of the arrangement.

2. Arrangement according to claim 1, characterised in that the arrangement comprises two further mirror structures, namely a third mirror structure and a fourth mirror structure, at an opposite surface of the substrate with a determined gap between the third and fourth mirror structures, whereby said gap serves as a cavity and the third and fourth mirror structures serve as mirrors of the reference Fabry-Perot interferometer.

3. Arrangement according to claim 2, characterised in that the gap between the third and fourth mirrors comprises solid material.

4. Arrangement according to claim 1, characterised in that the reference Fabry-Perot interferometer comprises the fixed mirror structure of the electrically tuneable Fabry-Perot interferometer, the substrate as a cavity and one further mirror structure at the opposite surface of the substrate.

5. Arrangement according to claim 4, characterised in that the substrate comprises a plurality of wells at the area of the reference Fabry-Perot interferometer, whereby the further mirror structure is at least in part located at the bottom surface of the wells.

6. Arrangement according to claim 1, characterised in that the reference Fabry-Perot interferometer covers a border area of the aperture of the arrangement.

7. Arrangement according to claim 1, characterised in that the arrangement comprises patterned material layer for forming the aperture, whereby the patterned material layer is located on a further mirror structure of the reference Fabry-Perot interferometer.

8. Method for producing a Fabry-Perot interferometer arrangement, wherein
 a substrate is provided (11),
 a first mirror structure is provided on the substrate (12, 13),
 a second, movable mirror structure is provided (15-17), whereby the first and second mirror structures comprise first and second mirrors which are substantially parallel,
 a Fabry-Perot cavity is provided between the first and second mirrors,
 providing electrodes (13, 15, 19) for electrical control of the distance between the mirrors,
 characterised in that
 at least one further mirror structure is provided at the opposite surface of the substrate for providing a reference interferometer.

9. Method according to claim 8, characterised in that layers for mirror structures of the reference interferometer are deposited simultaneously with the layers for mirror structures of he electrically tuneable interferometer.

10. Method according to claim 8, characterised in that layers for a mirror structure of the reference interferometer are deposited separately from deposition of the layers for mirror structures of the electrically tuneable interferometer.

* * * * *